(12) United States Patent
Moon et al.

(10) Patent No.: US 12,394,413 B2
(45) Date of Patent: Aug. 19, 2025

(54) DIALOGUE MANAGEMENT METHOD, USER TERMINAL AND COMPUTER-READABLE RECORDING MEDIUM

(71) Applicants: HYUNDAI MOTOR COMPANY, Seoul (KR); KIA CORPORATION, Seoul (KR)

(72) Inventors: Jaemin Moon, Yongin-si (KR); Minjae Park, Seongnam-si (KR); Sungwang Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 335 days.

(21) Appl. No.: 18/080,350

(22) Filed: Dec. 13, 2022

(65) Prior Publication Data

US 2023/0298581 A1  Sep. 21, 2023

(30) Foreign Application Priority Data

Mar. 16, 2022  (KR) .................. 10-2022-0032797

(51) Int. Cl.
*G10L 15/22* (2006.01)
*G06F 3/16* (2006.01)
*G10L 15/18* (2013.01)
*G10L 15/30* (2013.01)

(52) U.S. Cl.
CPC .............. *G10L 15/22* (2013.01); *G06F 3/167* (2013.01); *G10L 15/1815* (2013.01); *G10L 15/30* (2013.01)

(58) Field of Classification Search
USPC ....................................... 704/1–504
See application file for complete search history.

(56) References Cited

U.S. PATENT DOCUMENTS

| | | | |
|---|---|---|---|
| 11,037,548 B2* | 6/2021 | Kim | G10L 15/187 |
| 11,114,093 B2* | 9/2021 | Kim | H04W 72/1268 |
| 11,301,266 B2* | 4/2022 | Woo | G10L 15/22 |
| 11,314,898 B2* | 4/2022 | Rhee | G06V 40/197 |
| 11,361,765 B2* | 6/2022 | Park | G10L 15/10 |
| 11,574,626 B2* | 2/2023 | Choi | G10L 15/08 |
| 2019/0244612 A1* | 8/2019 | Han | G10L 15/02 |
| 2019/0325898 A1* | 10/2019 | O'Hart Kinney | G10L 15/02 |
| 2019/0378507 A1* | 12/2019 | Kawano | G10L 15/24 |
| 2019/0385600 A1* | 12/2019 | Kim | H04W 72/1268 |

(Continued)

FOREIGN PATENT DOCUMENTS

| | | |
|---|---|---|
| JP | H0836396 A | 2/1996 |
| KR | 10-2014-0070703 A | 6/2014 |
| KR | 10-2014-0079551 A | 6/2014 |

*Primary Examiner* — Marcus T Riley
(74) *Attorney, Agent, or Firm* — Morgan, Lewis & Bockius LLP

(57) ABSTRACT

A dialogue management method includes: obtaining at least one of a speech recognition result or a natural language understanding result for a speech of a user; determining whether a fixed speech pattern is included in the speech of the user, based on the at least one of the speech recognition result or the natural language understanding result for the speech of the user; and when the fixed speech pattern is included in the speech of the user, generating recommended speech information for guiding a completion of the speech of the user, based on at least one of a current dialogue context or a type of the fixed speech pattern included in the speech of the user.

26 Claims, 14 Drawing Sheets

(56) References Cited

U.S. PATENT DOCUMENTS

| | | | |
|---|---|---|---|
| 2019/0392827 A1* | 12/2019 | Park | G10L 15/1822 |
| 2020/0005766 A1* | 1/2020 | Kim | G10L 15/02 |
| 2020/0192684 A1* | 6/2020 | Woo | G06F 3/0488 |
| 2021/0142788 A1* | 5/2021 | Choi | G10L 15/08 |
| 2021/0335354 A1* | 10/2021 | Park | G10L 15/063 |
| 2023/0298581 A1* | 9/2023 | Moon | G06F 3/167 |

* cited by examiner

DIALOGUE MANAGEMENT METHOD, USER TERMINAL AND COMPUTER-READABLE RECORDING MEDIUM

CROSS-REFERENCE TO RELATED APPLICATION

The present application claims priority to Korean Patent Application No. 10-2022-0032797, filed on Mar. 16, 2022, the entire contents of which is incorporated herein for all purposes by this reference.

BACKGROUND OF THE PRESENT DISCLOSURE

Field of the Present Disclosure

The present disclosure relates to a dialogue management method, a user terminal, and a computer-readable recording medium which may process a user's speech.

Description of Related Art

A speech recognition technology is capable of identifying what is intended by a user's speech and providing a service corresponding to the identified user intention, such as controlling a specific device and providing specific information according to a user intention.

A dialogue management technology manages a dialogue with a user required to provide a service corresponding to a user intention and performs various processing for providing a service corresponding to a user intention.

Such a speech recognition technology and a dialogue management technology may be implemented as a speech recognition system or dialogue management system. The speech recognition system or dialogue management system may provide a service desired by a user in connection with various user terminals. A user may request a desired service by inputting a user's speech through a user terminal.

Meanwhile, when a user's speech is input, a filler may be included in the user's speech for not being able to come up with an appropriate word, etc. In the instant case, a dialogue process may be delayed or an error may occur in speech recognition, and thus an appropriate response to the filler included in the user's speech is required.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a dialogue management method, a user terminal, and a computer-readable recording medium that may, when a user may not smoothly input a user's speech, provide suitable recommended speech information depending on a specific speech pattern included in the speech of the user, guiding a smooth speech.

Additional aspects of the present disclosure will be set forth in part in the description which follows, and in part, will be obvious from the description, or may be learned by practice of the present disclosure.

According to an aspect of the present disclosure, there is provided a dialogue management method including: obtaining at least one of a speech recognition result or a natural language understanding result for a speech of a user; determining whether a fixed speech pattern is included in the speech of the user, based on the at least one of the speech recognition result or the natural language understanding result for the speech of the user; and when the fixed speech pattern is included in the speech of the user, generating recommended speech information for guiding a completion of the speech of the user, based on at least one of a current dialogue context or a type of the fixed speech pattern included in the speech of the user.

The type of the fixed speech pattern varies depending on a position of a specific constituent element included in the speech of the user and a characteristic of another constituent element uttered before the specific constituent element.

The fixed speech pattern includes a first speech pattern including only a specific constituent element which is meaningless, and a second speech pattern including a meaningful constituent element and the specific constituent element positioned after the meaningful constituent element.

When the first speech pattern is included in the speech of the user and a dialogue between a dialogue management system and the user is ongoing, the generating of the recommended speech information includes generating the recommended speech information based on an example speech corresponding to the ongoing dialogue.

When the second speech pattern is included in the speech of the user and a dialogue between a dialogue management system and the user is ongoing, the generating of the recommended speech information includes generating the recommended speech information by use of a constituent element omitted from the speech of the user among constituent elements of an example speech corresponding to the ongoing dialogue.

When the second speech pattern is included in the speech of the user and a dialogue between a dialogue management system and the user is not ongoing, the generating of the recommended speech information includes generating the recommended speech information based on an example speech similar to the speech of the user.

When the second speech pattern is included in the speech of the user and the dialogue between the dialogue management system and the user is not ongoing, the generating of the recommended speech information includes generating the recommended speech information by use of a constituent element omitted from the speech of the user among constituent elements of the example speech similar to the speech of the user.

The obtaining of the at least one of the speech recognition result or the natural language understanding result for the speech of the user includes obtaining the at least one of the speech recognition result or the natural language understanding result for the speech of the user in real time.

The specific constituent element includes a filler which is a meaningless constituent element input before, after or during speech.

The meaningful constituent element included in the second speech pattern forms an incomplete speech, and the fixed speech pattern further includes a third speech pattern including a constituent element forming a complete speech and the specific constituent element positioned after the constituent element forming the complete speech.

The dialogue management method further includes, when the third speech pattern is included in the speech of the user, generating a system response corresponding to the speech of the user.

According to an aspect of the present disclosure, there is provided a user terminal including: a microphone to which a speech of a user is input; a communication module configured to transmit the speech of the user to a dialogue management system and receive recommended speech information for guiding a completion of the speech of the user from the dialogue management system; and a display configured to display the received recommended speech information, wherein the recommended speech information is generated based on at least one of a current dialogue context or a type of a fixed speech pattern included in the speech of the user.

The fixed speech pattern includes a first speech pattern including only a specific constituent element which is meaningless, and a second speech pattern including a meaningful constituent element and the specific constituent element positioned after the meaningful constituent element.

When the first speech pattern is included in the speech of the user and a dialogue between the dialogue management system and the user is ongoing, the display is configured to display the recommended speech information generated based on an example speech corresponding to the ongoing dialogue.

When the second speech pattern is included in the speech of the user and a dialogue between the dialogue management system and the user is ongoing, the display is configured to display the recommended speech information generated by use of a constituent element omitted from the speech of the user among constituent elements of an example speech corresponding to the ongoing dialogue.

When the second speech pattern is included in the speech of the user and a dialogue between the dialogue management system and the user is not ongoing, the display is configured to display the recommended speech information generated based on an example speech similar to the speech of the user.

When the second speech pattern is included in the speech of the user and the dialogue between the dialogue management system and the user is not ongoing, the display is configured to display the recommended speech information generated by use of a constituent element omitted from the speech of the user among constituent elements of the example speech similar to the speech of the user.

The communication module is configured to transmit the input speech of the user to the dialogue management system in real time.

The specific constituent element includes a filler which is a meaningless constituent element input before, after or during speech.

According to an aspect of the present disclosure, there is provided a computer-readable recording medium storing a program for implementing a dialogue management method, the dialogue management method including: obtaining at least one of a speech recognition result or a natural language understanding result for a speech of a user; determining whether a fixed speech pattern is included in the speech of the user, based on the at least one of the speech recognition result or the natural language understanding result for the speech of the user; and when the fixed speech pattern is included in the speech of the user, generating recommended speech information for guiding a completion of the speech of the user, based on at least one of a current dialogue context or a type of the fixed speech pattern included in the speech of the user.

The fixed speech pattern includes a first speech pattern including only a specific constituent element which is meaningless, and a second speech pattern including a meaningful constituent element and the specific constituent element positioned after the meaningful constituent element.

When the first speech pattern is included in the speech of the user and a dialogue between a dialogue management system and the user is ongoing, the generating of the recommended speech information includes generating the recommended speech information based on an example speech corresponding to the ongoing dialogue.

When the second speech pattern is included in the speech of the user and a dialogue between a dialogue management system and the user is ongoing, the generating of the recommended speech information includes generating the recommended speech information by use of a constituent element omitted from the speech of the user among constituent elements of an example speech corresponding to the ongoing dialogue.

When the second speech pattern is included in the speech of the user and a dialogue between a dialogue management system and the user is not ongoing, the generating of the recommended speech information includes generating the recommended speech information based on an example speech similar to the speech of the user.

When the second speech pattern is included in the speech of the user and the dialogue between the dialogue management system and the user is not ongoing, the generating of the recommended speech information includes generating the recommended speech information by use of a constituent element omitted from the speech of the user among constituent elements of the example speech similar to the speech of the user.

The obtaining of the at least one of the speech recognition result or the natural language understanding result for the speech of the user includes obtaining the at least one of the speech recognition result or the natural language understanding result for the speech of the user in real time.

The specific constituent element includes a filler which is a meaningless constituent element input before, after or during speech.

The meaningful constituent element included in the second speech pattern forms an incomplete speech, and the fixed speech pattern further includes a third speech pattern including a constituent element forming a complete speech and the specific constituent element positioned after the constituent element forming the complete speech.

The computer-readable recording medium further includes, when the third speech pattern is included in the speech of the user, generating a system response corresponding to the speech of the user.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
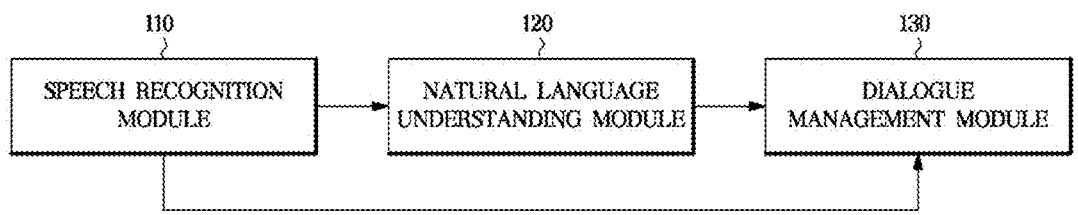
FIG. 1 is a block diagram illustrating constituent components used for processing a user's speech input.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The exemplary embodiments set forth herein and illustrated in the configuration of the present disclosure are only exemplary embodiments of the present disclosure, so it should be understood that they may be replaced with various equivalents and modifications at the time of the present disclosure.

Like reference numerals throughout the specification denote like elements.

Terminologies used herein are for describing various exemplary embodiments only and is not intended to limit the present disclosure.

It is to be understood that the singular forms are intended to include the plural forms as well, unless the context clearly dictates otherwise.

It will be further understood that the terms "include", "comprise" and/or "have" when used in the present specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. For example, without departing from the technical spirit or essential features of the present disclosure, a first element may be referred to as a second element, and also a second element may be referred to as a first element.

Descriptions shall be understood as to include any and all combinations of one or more of the associated listed items when the items are described by use of the conjunctive term "~and/or~", or the like.

Furthermore, the terms such as "~part", "~device", "~block", "~member", "~module", and the like may refer to a unit of processing at least one function or act. For example, the terms may refer to at least process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Hereinafter, various embodiments of the present disclosure are described in detail with reference to the accompanying drawings.

Figure 2:
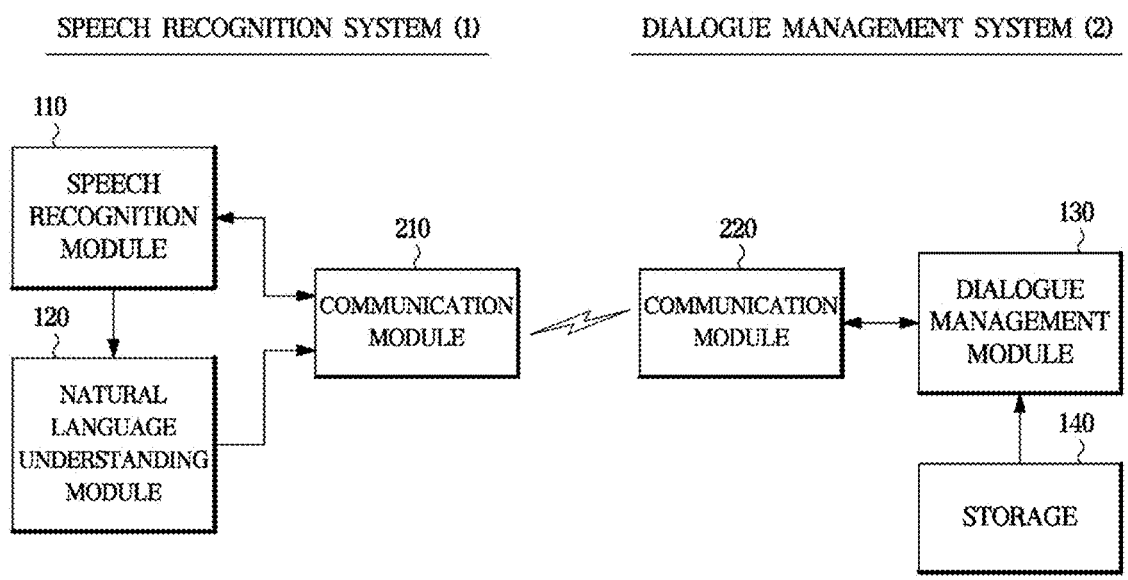
FIG. 2 is a block diagram illustrating an example where constituent components for processing a user's speech input are included in different systems.

FIG. 1 is a block diagram illustrating constituent components used for processing a user's speech input. FIG. 2 is a block diagram illustrating an example where constituent components for processing a user's speech input are included in different systems.

A speech recognition module 110 may be implemented with a speech to text (STT) engine, and perform conversion into text by applying a speech recognition algorithm to a user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To the present end, an acoustic model for modeling and comparing signal characteristics of voice or a language model for modeling a linguistic order of recognition vocabulary such as words or syllables may be used.

Furthermore, the speech recognition module 110 may convert the user's speech into the text based on learning where deep learning or machine learning is applied. In the exemplary embodiment of the present disclosure, a way of converting the user's speech into the text by the speech recognition module 110 is not limited thereto, and a variety of speech recognition techniques may be applied to convert the user's speech into the text.

A natural language understanding module 120 may apply a natural language understanding (NLU) technique to determine a user intention included in the input text. Accordingly, the natural language understanding module 120 may include an NLU engine that determines the user intention by applying the NLU technique to an input text. Here, the text output by the speech recognition module 110 is a sentence input to the natural language understanding module 120.

For instance, the natural language understanding module 120 may recognize an entity name from the input sentence. The entity name is a proper noun such as a name of an individual person, place, organization, time, day, currency, and the like. Named-entity recognition is for identifying an entity name in a sentence and classifying a type of the identified entity. A keyword may be extracted from a sentence through named-entity recognition to understand the meaning of the sentence.

Also, the natural language understanding module 120 may determine a domain from the input sentence. The domain may be for identifying a subject of the user's speech. For example, domains representing various subjects such as vehicle control, schedule, information related to weather or traffic conditions, text transmission, navigation, music, etc., may be determined based on the input sentence.

The natural language understanding module 120 may classify an intent included in the input sentence and extract a slot required to perform the corresponding intent. A slot may be filled by an entity.

For example, when the input sentence is "turn on the air conditioner", the domain may be [vehicle control] and the intent may be [turn on, air conditioner]. Also, the entity required to perform control corresponding to such an intent may be [temperature, air volume].

As an exemplary embodiment of the present disclosure, when the input sentence is "play a song", the domain may be [music], the intent may be [play, music], and the entity required to perform control corresponding to such an intent may be [artist, song name].

However, classification criteria, names, etc., of a domain and an intent may vary depending on a design. Accordingly, modules that perform operations to be described later may be encompassed by a scope of the present disclosure, regardless of the used names, classification criteria, etc., of domain and intent.

Meanwhile, similarly to the speech recognition module 110, the natural language understanding module 120 may also extract information such as a domain, intent, entity, etc., from the input sentence, based on a model trained by deep learning or machine learning. However, various embodiments of the present disclosure are not limited thereto and a way of extracting required information from an input sentence by the natural language understanding module 120 is not limited.

A dialogue management module 130 may generate a feedback to be output to a user terminal, based on an analysis result (results of STT and NLU) of the user's speech, performed in the speech recognition module 110 and the natural language understanding module 120, and dialogue management policies.

For example, the dialogue management module 130 may store a dialogue history with the user, and determine whether a dialogue is currently ongoing (extension of a previous dialogue) or a new dialogue begins based on the stored dialogue history. As will be described later, even when the same user's speech is input, different feedback may be generated depending on whether a dialogue is ongoing.

Also, the dialogue management module 130 may determine whether information required to perform an intent classified by the natural language understanding module 120 is sufficient. For example, when all entities corresponding to an intent are obtained, a message that guides an execution of the intent may be output and processing for executing the corresponding intent may be performed.

Furthermore, depending on design, even though all the entities corresponding to an intent are not obtained, when the intent is executable based on an entity of default value, processing for executing the intent according to the entity of default value may be performed.

When all the entities corresponding to an intent are not obtained and the intent is not executable before the entities are confirmed, a system speech for inquiring information related to an entity required by a user may be generated and output.

Furthermore, when an intent is not executable even though all the entities are obtained, a message notifying that the intent is not executable may be output as a system response.

Furthermore, when a specific constituent element, uttered before or after a sentence, or uttered between sentences, is included in a user's speech, the dialogue management module 130 may generate an appropriate feedback in response to the user's speech, which will be described in detail later.

For example, the above-described speech recognition module 110, the natural language understanding module 120 and the dialogue management module 130 may be implemented as a single system. In the instant case, when a user's speech is input to the system including the speech recognition module 110, the natural language understanding module 120 and the dialogue management module 130, the system may obtain an analysis result on the user's speech through speech recognition and natural language understanding, and generate a feedback about the user's speech based on the obtained analysis result.

As an exemplary embodiment of the present disclosure, as shown in FIG. 2, the speech recognition module 110 and the natural language understanding module 120 may be included in a speech recognition system 1, and the dialogue management module 130 may be included in a dialogue management system 2 which is a separate system. The names of systems 1 and 2 are arbitrarily provided, and thus, as long as the systems 1 and 2 may perform operations to be described below, the systems 1 and 2 may be encompassed by a scope of the present disclosure, regardless of the name.

In the exemplary embodiment of the present disclosure, a separate system may refer to a system implemented by a separate server. Also, a separate system may be operated by different operating entities.

In the exemplary embodiment of the present disclosure, being implemented as a single system does not necessarily mean being implemented by a single server. For example, each of the speech recognition system 1 and the dialogue management system 2 may be implemented by a plurality of servers.

When a user's speech is transmitted to the speech recognition system 1, the speech recognition module 110 and the natural language understanding module 120 may output an analysis result of the user's speech, and the output analysis result may be transmitted to the dialogue management system 2 through a communication module 210 provided in the speech recognition system 1.

When a communication module 220 provided in the dialogue management system 2 receives the analysis result of the user's speech, the dialogue management module 130 may generate a feedback about the user's speech based on the analysis result and dialogue management policies.

The feedback about the user's speech may include a system response including a processing signal for executing an intent and a system speech. Also, recommended speech information generated according to operations to be described later may be included in the feedback.

Each of the communication module 210 of the speech recognition system 1 and the communication module 220 of the dialogue management system 2 may wirelessly communicate with a base station or an access point (AP), and exchange data with external devices through the base station or access point.

For example, the communication modules 210 and 220 may wirelessly communicate with an access point using Wi-Fi (Wi-Fi⊚, IEEE 802.11 standard), or communicate with a base station using a code division multiple access (CDMA), wideband CDMA (WCDMA), global system for mobile communication (GSM), long term evolution (LTE), 5G, Wibro, and the like.

Also, the communication modules 210 and 220 may directly communicate with external devices. For example, the communication modules 210 and 220 may exchange data with external devices in a short distance using a Wi-Fi direct, Bluetooth (Bluetooth⊚, IEEE 802.15.1 standard), Zigbee (Zigbee⊚, IEEE 802.15.4 standard), etc.

The speech recognition system 1 and the dialogue management system 2 may include at least one memory storing a program performing the aforementioned operations or operations to be described later and at least one processor implementing a stored program.

In the speech recognition system 1, the speech recognition module 110 and the natural language understanding module 120 may use separate memories and processors, or share a memory and a processor.

Alternatively, the speech recognition module 110 may be included in the speech recognition system 1, and the natural language understanding module 120 and the dialogue management module 130 may be included in the dialogue management system 2.

Alternatively, the speech recognition module 110, the natural language understanding module 120 and the dialogue management module 130 may be implemented as separate systems, respectively. In the instant case, the speech recognition module 110 may be implemented as a speech recognition system, the natural language understanding module 120 may be implemented as a natural language understanding system, and the dialogue management module 130 may be implemented as a dialogue management system.

Figure 3:
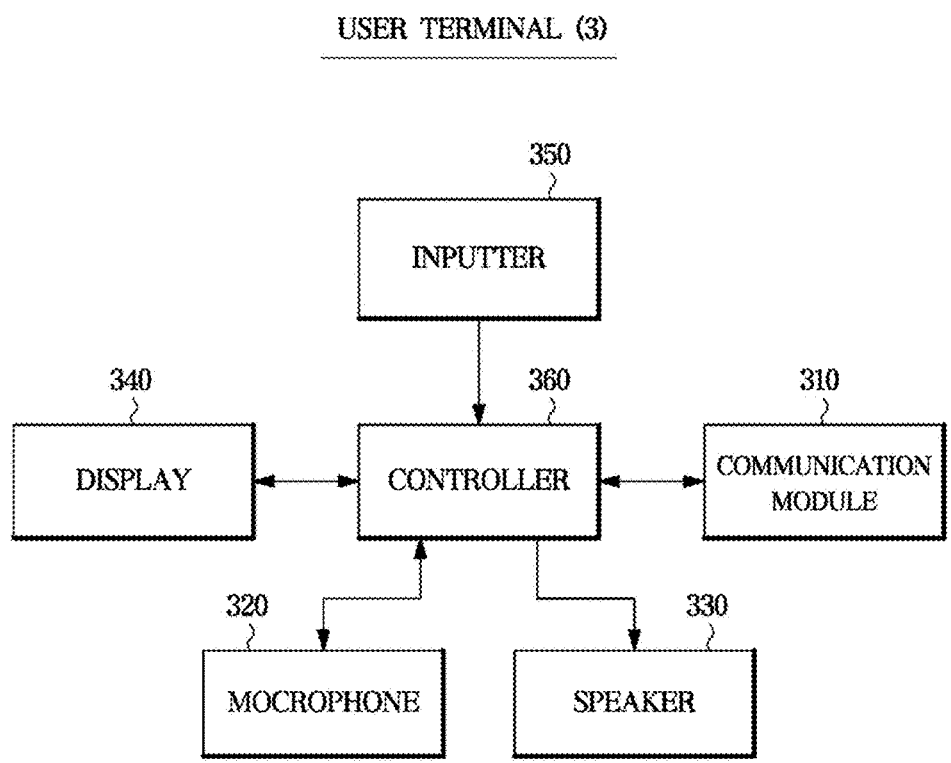
FIG. 3 is a block diagram illustrating constituent components of a user terminal according to an exemplary embodiment of the present disclosure.
Figure 4:
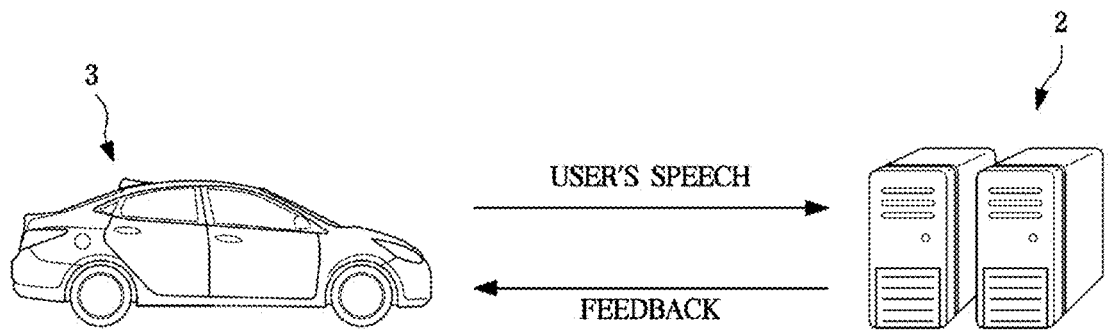
FIG. 4 and FIG. 5 are diagrams illustrating information exchanged between a dialogue management system and a user terminal according to an exemplary embodiment of the present disclosure.
Figure 5:
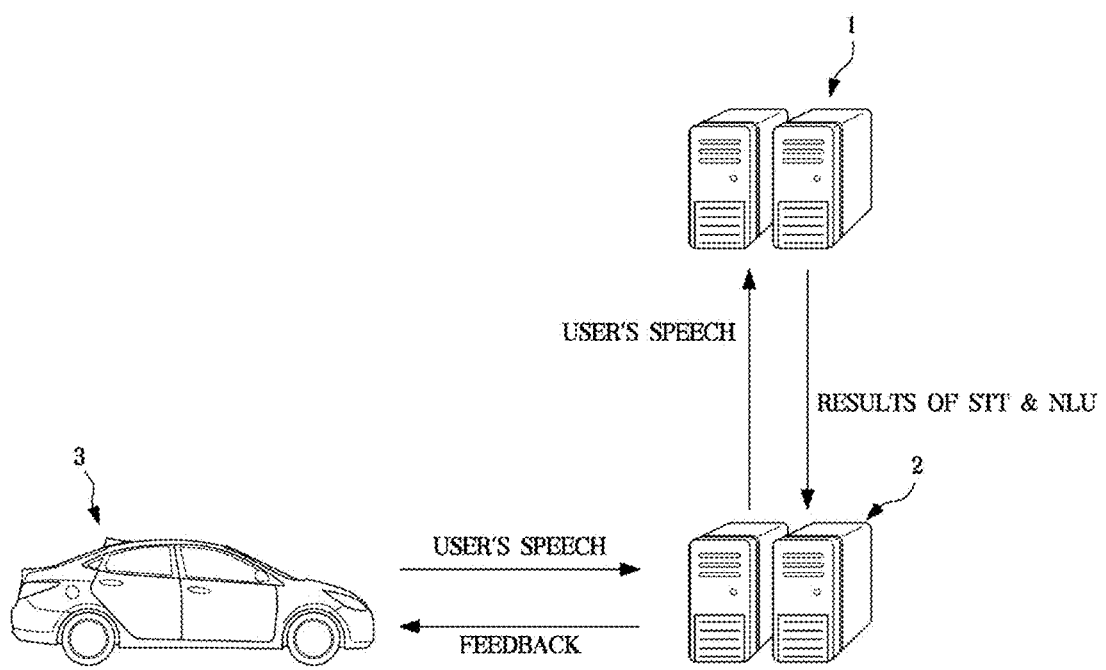

FIG. 3 is a block diagram illustrating constituent components of a user terminal according to an exemplary embodiment of the present disclosure. FIG. 4 and FIG. 5 are diagrams illustrating information exchanged between a dialogue management system and a user terminal according to an exemplary embodiment of the present disclosure.

A user terminal 3 is an electronic device provided as a gateway between a user and the speech recognition system 1 or the dialogue management system 2. The user terminal 3 may include various interface devices for receiving a user's speech and outputting a feedback about the user's speech, and a communication device configured for fluidically-communicating with the speech recognition system 1 or the dialogue management system 2.

For example, the user terminal 3 may be a mobile device such as a smartphone, tablet PC, laptop, etc., a wearable device such as a smartwatch, smartglasses, etc., home appliances including a microphone and a speaker such as a television, refrigerator, air conditioner, air purifier, vacuum cleaner, washing machine, etc., or smart speaker (AI speaker).

Alternatively, the user terminal 3 may be a vehicle. A user's speech may be input through a microphone provided in the vehicle and be transmitted to the speech recognition system 1 or the dialogue management system 2 through a communication module provided in the vehicle. Furthermore, when a feedback is transmitted form the dialogue management system 2, a speaker, a display, or other constituent components, provided in the vehicle, may be controlled to perform processing corresponding to the feedback.

Referring to FIG. 3, the user terminal 3 may include a communication module 310, a microphone 320, a speaker 330, a display 340, an inputter 350, and a controller 360 controlling constituent components of the user terminal 3.

The communication module 310 may include a wireless communication module exchanging data with external devices wirelessly. Also, the communication module 310 may further include a wired communication module exchanging data with external devices by wire.

The wired communication module may exchange data with external devices connected through a USB terminal, an AUX terminal, and the like.

The wireless communication module may wirelessly communicate with a base station or an access point (AP), and exchange data with external devices through a base station or an access point.

For example, the wireless communication module may wirelessly communicate with an access point using Wi-Fi (Wi-Fi⊚, IEEE 802.11 standard), or communicate with a base station using a CDMA, WCDMA, GSM, LTE, 5G, Wibro, and the like.

Also, the wireless communication module may directly communicate with external devices. For example, the wireless communication module may exchange data with external devices in a short distance using a Wi-Fi direct, Bluetooth (Bluetooth⊚, IEEE 802.15.1 standard), Zigbee (Zigbee⊚, IEEE 802.15.4 standard), etc.

For example, when the user terminal 3 is implemented as a vehicle, the communication module 310 may communicate with a mobile device located inside the vehicle through a Bluetooth communication, receiving information (user images, user speech, contact numbers, schedules, etc.) obtained by or stored in the mobile device. Also, the communication module 310 may communicate with the speech recognition system 1 or the dialogue management system 2 through 4G or 5G communication, transmitting a user's speech and receiving an analysis result of the user's speech.

A user's speech may be input to the microphone 320. When the user terminal 3 is implemented as a vehicle, a user may be a driver or an occupant. The microphone 320 may be provided on a steering wheel, a center fascia, a headliner, or a rear-view mirror, etc., to receive a speech command from the driver or a front occupant.

Also, two or more microphones 320 may be provided. In the instant case, as described above, a first microphone may be provided to receive a driver's speech command, and a second microphone may be provided to receive a rear occupant's speech command, for example, be provided on at least one of a rear armrest, rear doors, B pillar or C pillar, or headliner of the vehicle.

The speaker 330 may output a variety of audios related to a system response received from the dialogue management system 2. The speaker 330 may output a system speech transmitted from the dialogue management system 2, and output a content signal corresponding to the system response.

Also, regardless of a system response, music, radio or audio of multimedia content may be output, and audios for route guidance while a navigation function is operating may be output.

The display 340 may display various information related to a system response received from the dialogue management system 2. The display 340 may display a system speech, output through the speaker 330, as text, and when a user selection from a plurality of items is required to execute an intent corresponding to a user's speech, display a list of the plurality of items.

Also, the display 340 may display a message notifying that the intent corresponding to the user's speech is executed, and display recommended speech information for guiding a user's speech, as described below.

Furthermore, the display 340 may display information required to perform other functions of the user terminal 3, such as outputting multimedia content, regardless of system response.

For example, when the user terminal 3 is implemented as a vehicle, the display 340 may include an audio, video, navigation (AVN) display provided on a center fascia of the vehicle, a cluster display, or a head-up display (HUD).

Alternatively, the display 340 may include a rear seat display provided on a back of the front seat's headrest so that a rear occupant may see the rear seat display. When the vehicle is a multi-seater vehicle, the display 340 may include a display mounted on a headliner of the vehicle.

The display 340 may be provided anywhere as long as users inside the vehicle may see the display 340, and the position or the number of displays 340 are not limited.

The user terminal 3 may further include the inputter 350 for manually receiving a user command, in addition to the microphone 320. The inputter 350 may be provided as a jog shuttle, a button or a touchpad. When the inputter 350 is provided as a touchpad, the inputter 350 together with the display 340 may be implemented as a touchscreen.

For example, when the user terminal 3 is implemented as a vehicle, the inputter 350 may include an inputter provided as a jog shuttle or a button, in an area where an audio, video and navigation (AVN) is provided on a center fascia, in an area where a gearbox is provided, or on a steering wheel.

Also, to receive a control command related to passenger seats, the inputter 350 may include an inputter provided on each door of the vehicle, and an inputter provided on a front armrest or a rear armrest.

The controller 360 may control the constituent components of the user terminal 3 so that operations to be described below are performed.

In an example where the user terminal 3 is implemented as a vehicle and the speech recognition module 110 and the natural language understanding module 120 are included in the dialogue management system 2, as shown in FIG. 4, a user's speech input through the microphone 320 of the user terminal 3 may be transmitted to the dialogue management system 2 through the communication module 310.

When the communication module 220 of the dialogue management system 2 receives the user's speech and the speech recognition module 110 and the natural language understanding module 120 output an analysis result of the user's speech, the dialogue management module 130 may generate an appropriate system response based on the analysis result of the user's speech and transmit the system response to the user terminal 3 through the communication module 220.

Alternatively, in an example where the user terminal 3 is implemented as a vehicle and the speech recognition system 1 and the dialogue management system 2 are implemented as a separate system, as shown in FIG. 5, a user's speech input through the microphone 320 of the user terminal 3 may be transmitted to the dialogue management system 2 through the communication module 310.

The dialogue management system 2 may transmit the user's speech to the speech recognition system 1 and receive an analysis result (results of STT and NLU) of the user's speech from the speech recognition system 1.

The dialogue management module 130 may generate an appropriate feedback based on the analysis result of the user's speech, and transmit the feedback to the user terminal 3 through the communication module 220.

Figure 6:
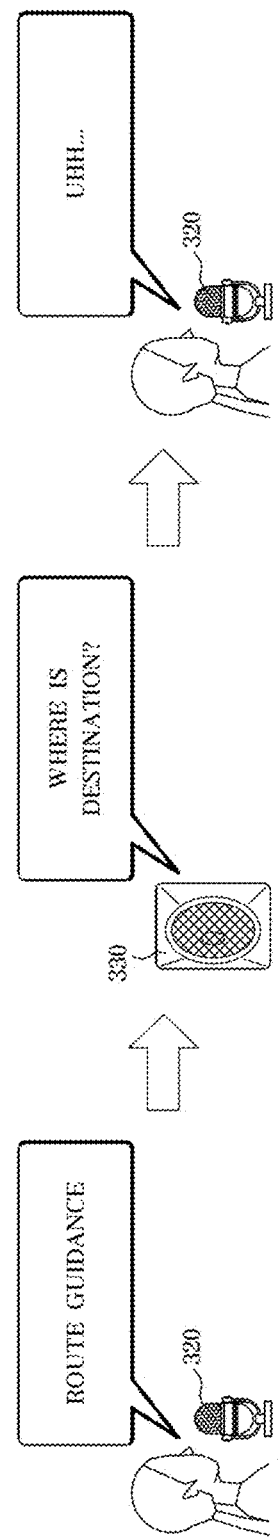
FIG. 6, FIG. 7, and FIG. 8 are diagrams illustrating examples where a filler is included in a user's speech input to a user terminal according to an exemplary embodiment of the present disclosure.
Figure 7:
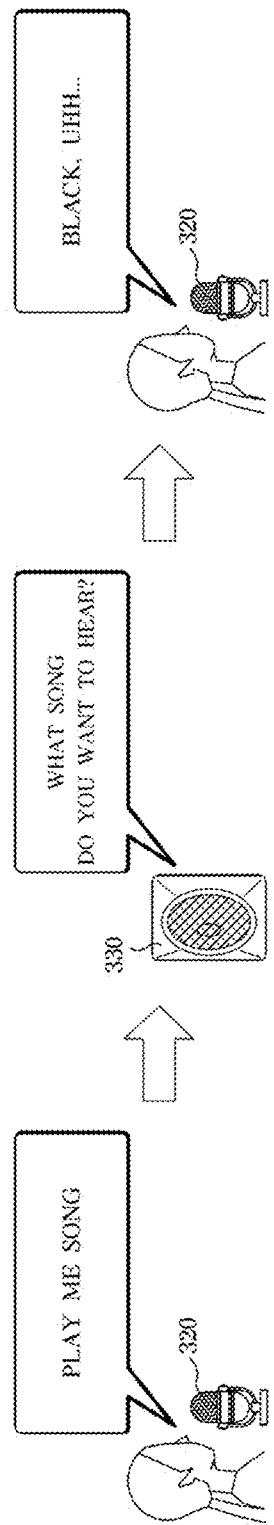
Figure 8:
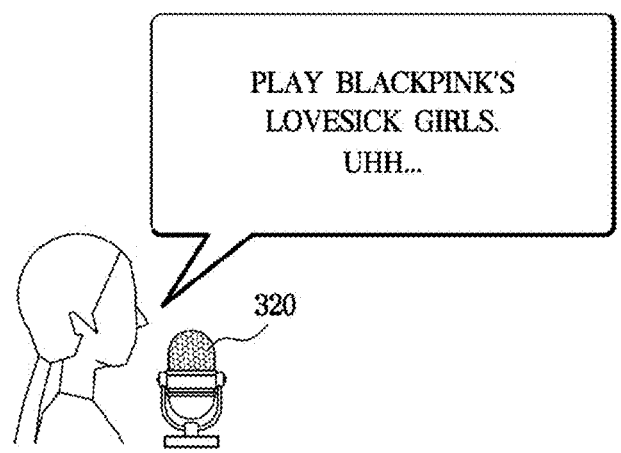

FIG. 6, FIG. 7, and FIG. 8 are diagrams illustrating examples where a filler is included in a user's speech input to a user terminal according to an exemplary embodiment of the present disclosure.

As described above, the dialogue management module 130 may generate an appropriate feedback, when a specific constituent element, which is input before, after or during a user's speech, is included in the user's speech.

Here, the specific constituent element may include a filler which may be referred to as a 'filled pause'. The filler may refer to a sound that a speaker makes, when the speaker does not come up with what he or she is trying to say, or to buy time. That is, the filler is a semantically empty element in a speech and is configured to fill a pause between meaningful speeches.

As described above, even though a filler itself has no meaning, because an end point detection (EPD) may not be made while the filler is being uttered, it may be recognized that a speech has not ended yet. Accordingly, for smooth dialogue processing, when a filler is uttered, an appropriate processing is required.

According to an exemplary embodiment of the present disclosure, when a specific speech pattern including a filler is included in a user's speech, the dialogue management system 2 and dialogue management method may recognize the specific speech pattern, generate and provide appropriate recommended speech information depending on a type of the specific speech pattern included in the user's speech.

The type of specific speech pattern may vary depending on a position of filler in the speech and a characteristic of another constituent element other than the filler. FIG. 6 is referred to as an example. When a user inputs a user's speech, "route guidance", through the microphone 320, the dialogue management system 2 may output a system speech, "where is a destination?", to obtain information related to the destination.

In the present instance, the user who does not recall a name of the destination may utter a filler such as "uhh . . . ". Accordingly, a speech pattern without a meaningful constituent element, uttered before the filler is uttered, is referred to as a first speech pattern.

Here, the meaningful constituent element may be a morpheme or a word, or a syllable or a set of syllables forming the morpheme or word. Alternatively, any constituent elements except for a filler may be defined as a meaningful constituent element.

Referring to FIG. 7, when a user inputs a user's speech, "play me a song", through the microphone 320, the dialogue management system 2 may output a system speech, "what song do you want to hear?", to obtain information related to the song to play.

In the present instance, the user who recalls only part of the artist's name may make an utterance such as "black, uhh . . . ". Accordingly, a speech pattern including a meaningful constituent element, uttered before a filler is uttered but forms an incomplete speech pattern, is referred to as a second speech pattern. Here, the incomplete speech pattern may refer to a speech pattern in which an intent and an entity may not be specified.

Referring to FIG. 8, a user may input a user's speech, "play the BLACKPINK'S 'LOVESICK GIRLS'", through the microphone 320, and then habitually add a filler such as "umm . . . ". Accordingly, when a meaningful constituent element input before a filler is uttered forms a complete speech, such a speech pattern may be referred to as a third speech pattern.

Here, the complete speech does not refer to a grammatically complete sentence including constituent elements such as a subject and a verb, but may refer to a speech where an intent or an entity may be specified.

Hereinafter, operations of generating recommended speech information depending on a type of speech pattern included in a user's speech according to the present disclosure are described in detail.

Figure 9:
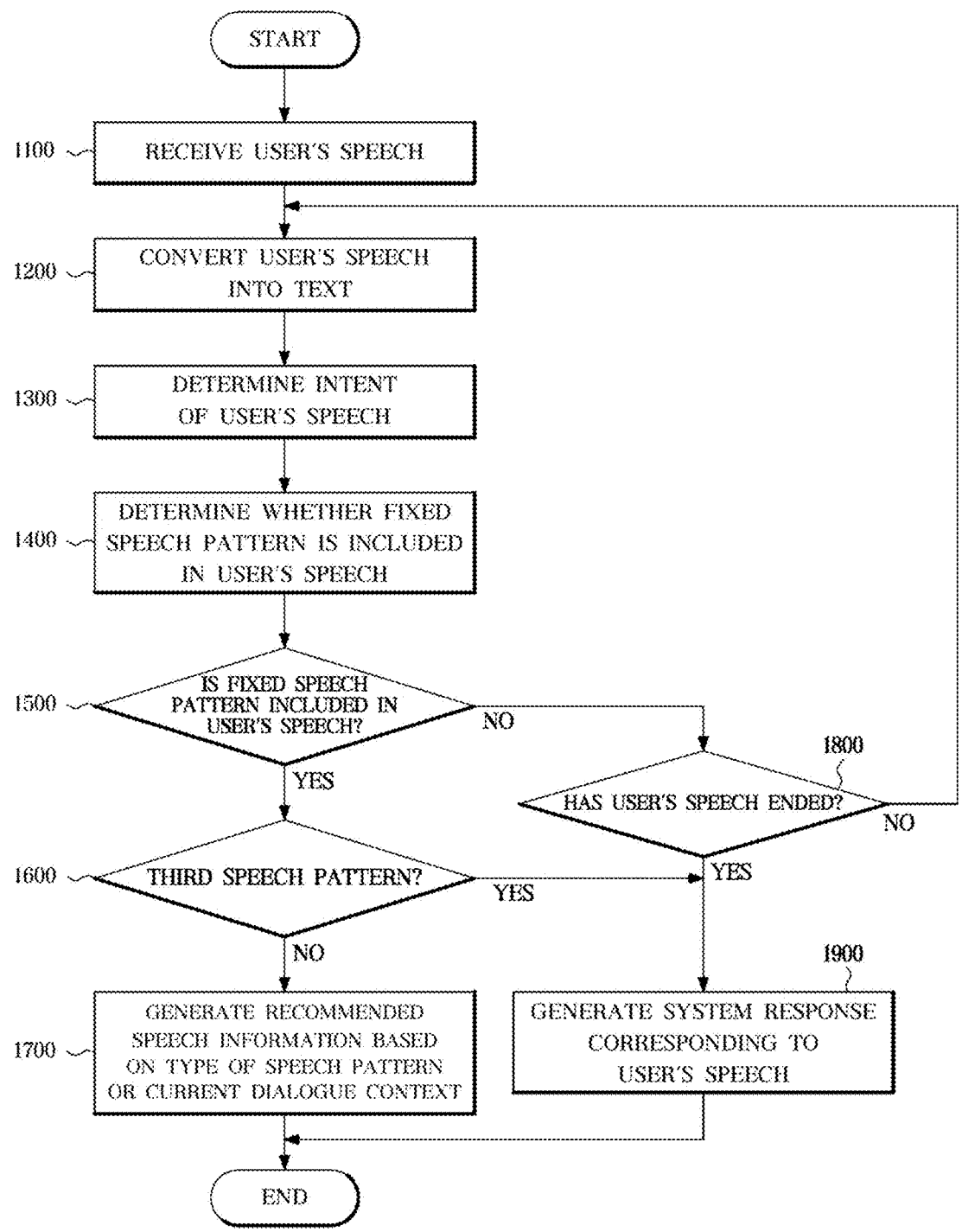
FIG. 9 is a flowchart illustrating a dialogue management method according to an exemplary embodiment of the present disclosure.

FIG. 9 is a flowchart illustrating a dialogue management method according to an exemplary embodiment of the present disclosure.

A dialogue management method according to various exemplary embodiments of the present disclosure may be performed by the dialogue management system 2 according to an exemplary embodiment of the present disclosure. Therefore, a description on the dialogue management system 2 described above is applicable to various exemplary embodiments of the dialogue management method, even when not specifically described below. A description on the dialogue management method to be described below may also be applied to various exemplary embodiments of the dialogue management system 2, even when not specifically described below.

Referring to FIG. 9, a user's speech input through the microphone 320 is received (1100).

The user's speech may be transmitted in a form of audio signal, and the user's speech transmitted from the user terminal 3 may be received by the communication module 210 of the speech recognition system 1 or the communication module 220 of the dialogue management system 2.

The speech recognition module 110 may convert the user's speech into text (1200).

An operation of converting the user's speech into text has been described above. In the present instance, the conversion into text may be performed in real time, as the user's speech is received from the user terminal 3.

Also, the natural language understanding module 120 may determine an intent of the user's speech (1300). Furthermore, the natural language understanding module 120 may also determine a domain, an entity, etc., of the user's speech.

The dialogue management module 130 may determine whether a fixed speech pattern is included in the user's speech, based on the speech recognition result or the natural language understanding result (1400).

As described above with reference to FIGS. 6, 7 and 8, the fixed speech pattern is a speech pattern including a filler, and may be divided into a first speech pattern, a second speech pattern, and a third speech pattern, depending on a position of a filler in the user's speech or a characteristic of another constituent element in the user's speech.

The dialogue management module 130 may determine whether a filler is included in the user's speech based on the speech recognition result obtained by converting the user's speech into text. Alternatively, the natural language understanding module 120 may extract the filler as a kind of an entity and transmit the extraction result to the dialogue management module 130.

When the fixed speech pattern is included in the user's speech (Yes in operation 1500) and the speech pattern included in the user's speech is not the third speech pattern (No in operation 1600), the dialogue management module 130 may generate recommended speech information, based on a type of speech pattern or current dialogue context (1700).

The recommended speech information may vary depending on whether the speech pattern included in the user's speech is the first speech pattern or the second speech pattern, and depending on whether a dialogue is currently ongoing or a dialogue just has started by the user's speech.

When the speech pattern included in the user's speech is the third speech pattern (Yes in operation 1600), indicating that an already completed speech is input. Accordingly, even though it is not determined that the user's speech has ended because an EPD is not made, a system response corresponding to the user's speech may be generated (1900). Thus, when a speech command has practically ended, even though the EPD is not made due to a filler uttered by the user, an intent may be executed.

When the fixed speech pattern is not included in the user's speech (No in operation 1500), and when the user's speech has not ended, i.e., when the EPD is not made (No in operation 1800), the operations of receiving the user's speech and performing conversion into text are repeated.

When the user's speech has ended (Yes in operation 1800), a system response corresponding to the user's speech may be generated (1900).

A portion of operations described above with reference to FIG. 9 may be omitted from an exemplary embodiment of the dialogue management method. For example, operations, performed by the speech recognition system 1, among the operations shown in FIG. 9 may be omitted from an exemplary embodiment of the dialogue management method.

Figure 10:
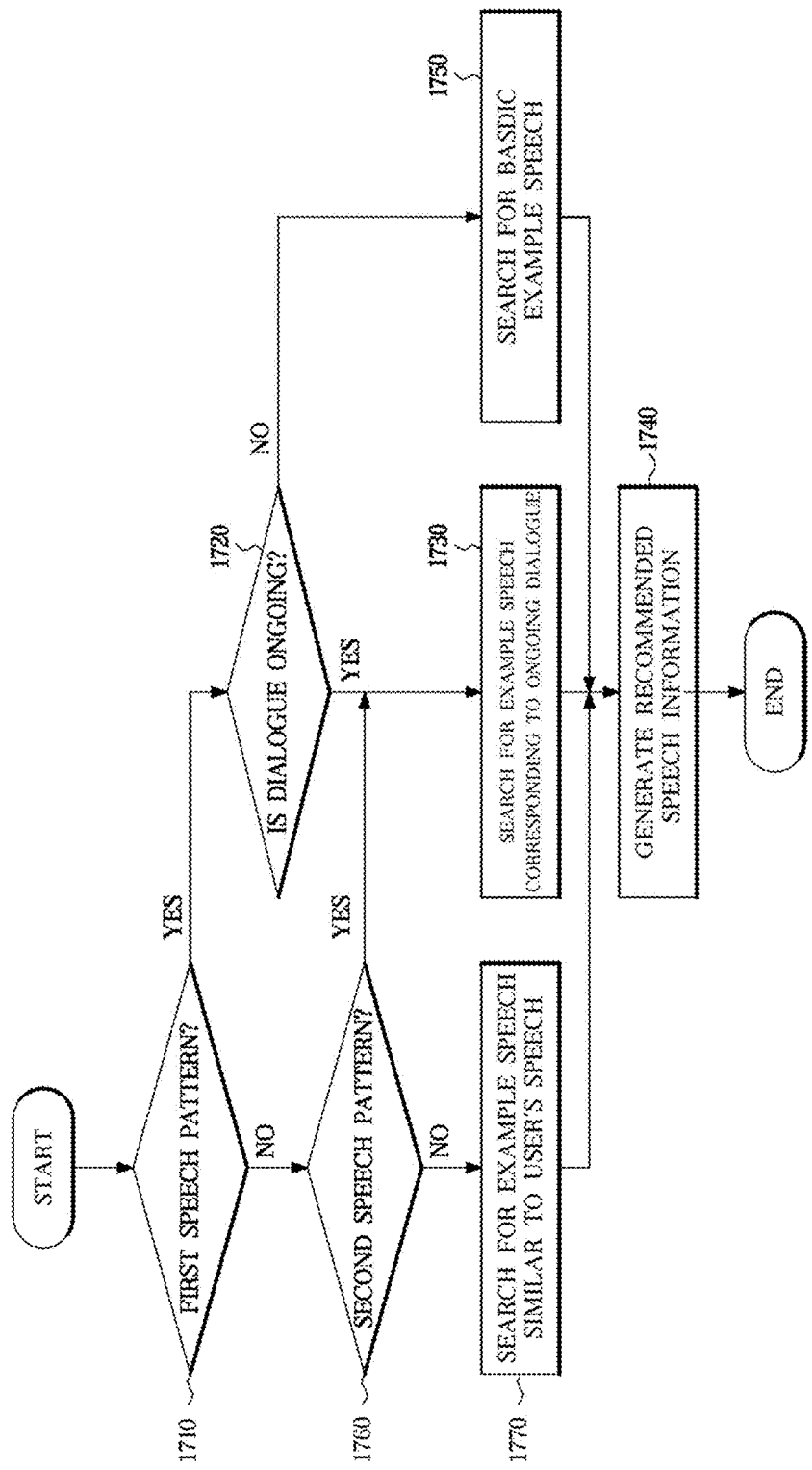
FIG. 10 is a flowchart illustrating operations of generating recommended speech information, in a dialogue management method according to an exemplary embodiment of the present disclosure.

FIG. 10 is a flowchart illustrating operations of generating recommended speech information, in a dialogue management method according to an exemplary embodiment of the present disclosure.

Referring to FIG. 10, when a speech pattern included in a user's speech corresponds to a first speech pattern (Yes in operation 1710), and when a current dialogue context corresponds to an ongoing dialogue (Yes in operation 1720), an example speech corresponding to the ongoing dialogue is searched for (1730).

The dialogue management module 130 may store information related to dialogue context in the storage 140. Information related to a previous dialogue history, information related to currently ongoing dialogue context, etc., may be stored in the storage 140.

The information related to the currently ongoing dialogue context may include information related to a domain, a task, an action, etc., of the currently ongoing dialogue. Here, the task may indicate an operation performed by the dialogue management system 2 to execute an intent, included in the user's speech, or to proceed a dialogue, and the action may indicate an operation performed when the intent is executed.

The information related to a previous dialogue history may include information related to context of an already ended dialogue.

Also, information related to an example speech for each dialogue context may be stored in the storage 140. For example, user's speeches input for each domain and task may be stored as an example speech. An example speech corresponding to an ongoing dialogue may refer to an example speech matched and stored for the same domain and the same task as a current dialogue context.

Such an example speech may be obtained from a plurality of users, and a plurality of example speeches may be stored for the same domain and the same task. The plurality of example speeches may be stored together with information related to frequency of speeches uttered by a plurality of users. The dialogue management module 130 may generate the recommended speech information by considering a frequency of each of the example speeches.

For example, the dialogue management module 130 may generate the recommended speech information by use of top N (N is an integer greater than or equal to 2) example speeches in an order of highest frequency. Also, a list may be generated by determining priorities according to the frequency and arranging example speeches in an order of predetermined priority.

When the speech pattern included in the user's speech corresponds to the first speech pattern (Yes in operation 1710), and when the current dialogue context does not correspond to an ongoing dialogue (No in operation 1720), a basic example speech is searched for (1750).

The basic example speech may be a set of example speeches for guiding a user's speech command and be stored in the storage 140.

When the speech pattern included in the user's speech corresponds to the second speech pattern (No in operation 1710 and Yes in operation 1760), and when the current dialogue context corresponds to an ongoing dialogue (Yes in operation 1720), an example speech corresponding to the ongoing dialogue is searched for (1730) and recommended speech information may be generated based on the retrieved example speech (1740).

The second speech pattern includes a filler, like the first speech pattern, but includes a meaningful constituent element uttered before the filler. Accordingly, when searching for the example speech corresponding to the ongoing dialogue, an example speech similar to the user's speech including the meaningful constituent element may be searched for.

For example, an example speech including a meaningful constituent element may be searched for from among example speeches corresponding to an ongoing dialogue. Also, an example speech including a meaningful constituent element positioned the same as the user's speech may be searched for from among example speeches including the meaningful constituent element.

When the speech pattern included in the user's speech corresponds to the second speech pattern (No in operation 1710 and Yes in operation 1760), and when the current dialogue context does not correspond to an ongoing dialogue (No in operation 1720), an example speech similar to the user's speech is searched for (1770) and recommended speech information may be generated based on the retrieved example speech (1740).

The example speech similar to the user's speech may be an example speech similar to the user's speech among example speeches for entire context stored in the storage 140. For example, among the example speeches for the entire context stored in the storage 140, an example speech including a meaningful constituent element, which is included in and positioned the same as the user's speech, may be searched for.

The recommended speech information may include at least one retrieved example speech. When a plurality of example speeches are included, a list of the plurality of example speeches arranged according to a criterion such as a spoken frequency, etc., may be included in the recommended speech information.

The generated recommended speech information may be transmitted to the user terminal 3. The user terminal 3 may visually or audibly output the recommended speech information through the display 340 or the speaker 330.

Figure 11:
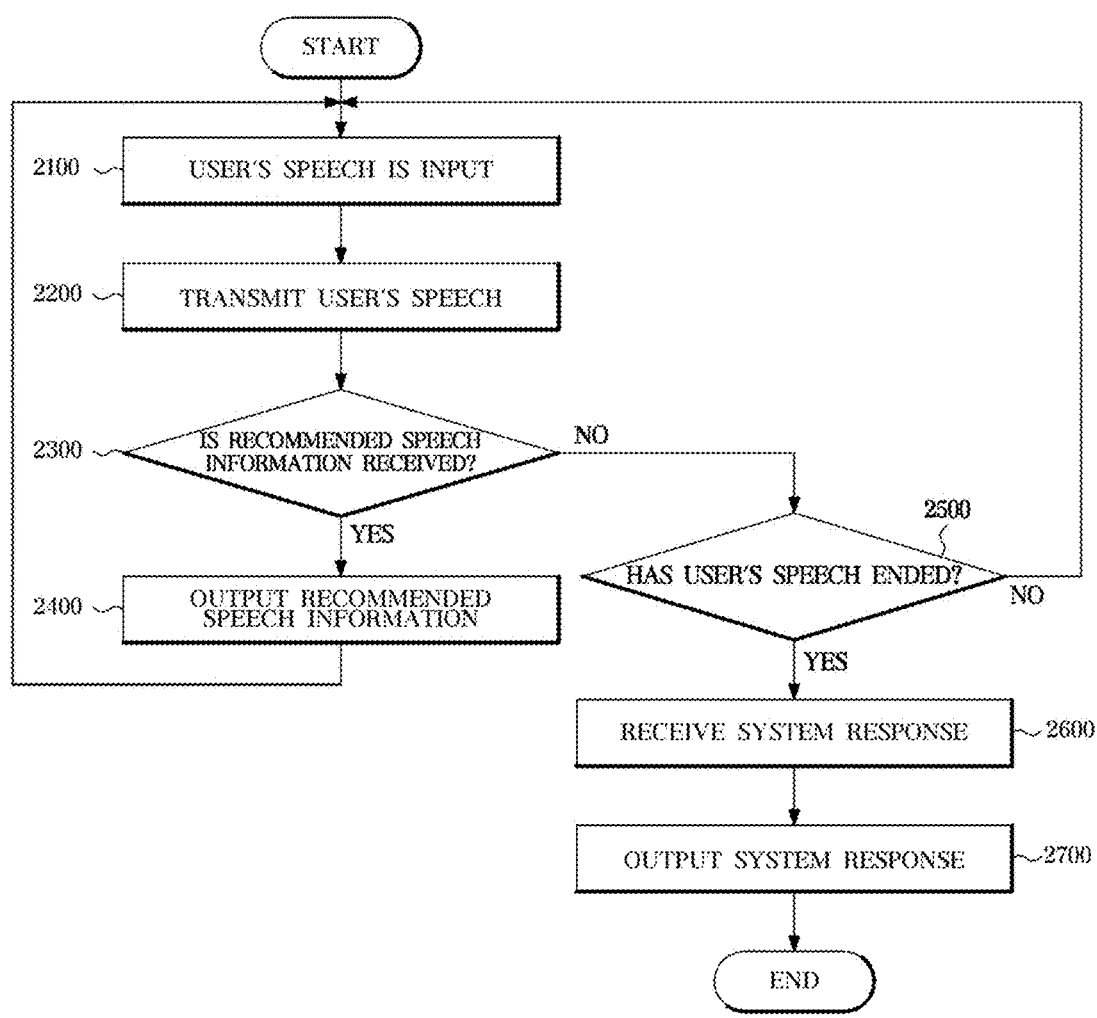
FIG. 11 is a flowchart illustrating a method of controlling a user terminal according to an exemplary embodiment of the present disclosure.

FIG. 11 is a flowchart illustrating a method of controlling a user terminal according to an exemplary embodiment of the present disclosure.

A method of controlling a user terminal according to various exemplary embodiments of the present disclosure may be performed by the user terminal 3 according to an exemplary embodiment of the present disclosure. Therefore, a description on the user terminal 3 described above is applicable to the method of controlling a user terminal, even when not specifically described below. A description on the method of controlling a user terminal described below may also be applied to various exemplary embodiments of the user terminal 3, even when not specifically described below.

Referring to FIG. 11, a user's speech is input to the microphone 320 provided in the user terminal 3 (2100).

The controller 360 of the user terminal 3 may control the communication module 310 to transmit the user's speech to the speech recognition system 1 or the dialogue management system 2 (2200).

When the user's speech is input to the microphone 320, the microphone 320 converts the user's speech in a form of sound wave into an audio signal which is an electrical signal, and outputs the audio signal. Accordingly, the user's speech after being output from the microphone 320 may be processed as an audio signal form.

When the user's speech is transmitted to the speech recognition system 1 or the dialogue management system 2 in real time, according to the above-described dialogue management method, operations of determining whether a fixed speech pattern is included and generating recommended speech information in real time may be performed.

When the recommended speech information is received from the dialogue management system 2 (Yes in operation 2300), the user terminal 3 may output the recommended speech information (2400).

For example, the controller 360 may control the display 340 to visually output the recommended speech information, or control the speaker 330 to audibly output the recommended speech information.

As described above, when a user utters a filler such as "uhh . . . " or "umm . . . ", recommended speech information may be output and the output of the recommended speech information may be performed in real time in response to the user's speech input. Accordingly, the user may input an appropriate subsequent speech based on the recommended speech information output through the display 340 or the speaker 330.

When the recommended speech information is not received (No in operation 2300), the user's speech, input until the user's speech end portions (No in operation 2500), may be transmitted to the dialogue management system 2.

When the user's speech has ended (Yes in operation 2500), a system response may be received (2600) and be output (2700).

FIG. 12, FIG. 13, FIG. 14, FIG. 15, FIG. 16, FIG. 17 and FIG. 18 are diagrams illustrating examples of recommended speech information generated by a dialogue management method according to an exemplary embodiment and output by a vehicle.

Figure 12:
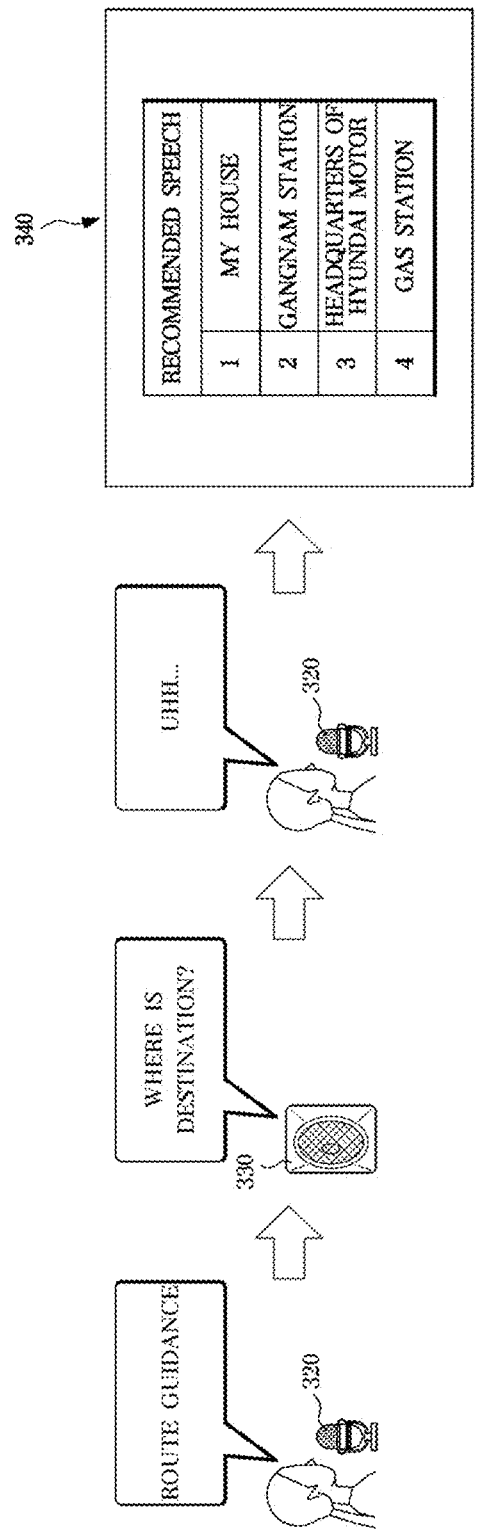
FIG. 12, FIG. 13, FIG. 14, FIG. 15, FIG. 16, FIG. 17 and FIG. 18 are diagrams illustrating examples of recommended speech information generated by a dialogue management method according to an exemplary embodiment and output by a vehicle.

As shown in FIG. 12, when a user input a user's speech, "route guidance", through the microphone 320, the dialogue management system 2 may output a system speech, "where is a destination?", to obtain information related to the destination. In the present instance, the user who does not recall a name of the destination may utter a filler such as "uhh . . . ".

The user's speech may be transmitted to the speech recognition system 1 or the dialogue management system 2 in real time, and the dialogue management module 130 may determine that the user's speech includes a first speech pattern based on a speech recognition result and a natural language understanding result.

Also, the dialogue management module 130 may determine that a dialogue is currently ongoing based on a current dialogue context stored in the storage 140. A domain and a task of the current dialogue context are 'navigation' and [Ask, poi] for asking a destination, respectively.

Figure 13:
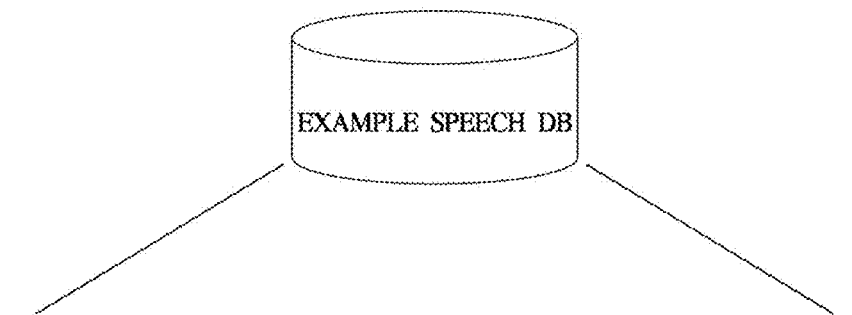

Referring to FIG. 13, the dialogue management module 130 may search an example speech database for example speeches including 'navigation' as a domain and [Ask, poi] as a task. The example speech database is stored in the storage 140.

For example, the dialogue management module 130 may search for four example speeches in an order of highest spoken frequency, and generate recommended speech information. Furthermore, when generating the recommended speech information, the dialogue management module 130 may provide a weight based on a spoken frequency for each user. That is, the dialogue management module 130 may generate the recommended speech information by considering both the spoken frequency of all users and the spoken frequency of an individual user.

The four example speeches may be arranged in an order of highest spoken frequency to form a list, and the user terminal 3 receiving the recommended speech information may display the received list on the display 340. The user may finish the user's speech by referring to the list displayed on the display 340.

Figure 14:
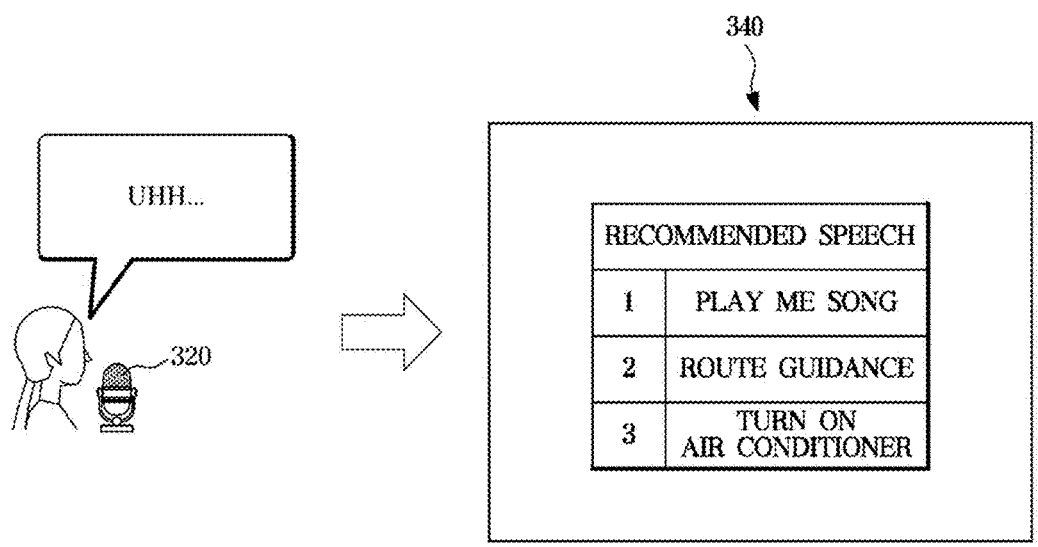

Referring to FIG. 14, a user utters a filler such as "uhh . . . " first, because he or she does not come up with what he or she is trying to say. That is, a first speech pattern without a meaningful constituent element input before a filler is uttered may be included in the user's speech.

Because a current dialogue context is not an ongoing dialogue, the dialogue management module 130 may search the storage 140 for a basic example speech, and generate recommended speech information based on the retrieved basic example speech.

The basic example speech may be a set of example speeches preemptively output for guiding a user's speech, which is referred to as a nudge.

The basic example speech may be a set of example speeches arranged in an order of highest spoken frequency among the entire example speeches stored in the storage 140.

Alternatively, the basic example speech may be a set of example speeches corresponding to a current context. For example, the basic example speech may be a set of speeches mainly uttered by all the users or an individual user in context corresponding to at least one of a current season, a time period, or a driving condition.

Alternatively, the basic example speech may be a set of pre-stored example speeches to be output in context corresponding to at least one of a current season, a time period, or a driving condition.

The recommended speech information generated based on the basic example speech may be transmitted to the user terminal 3, and the user terminal 3 may be display the transmitted recommended speech information on the display 340.

Figure 15:
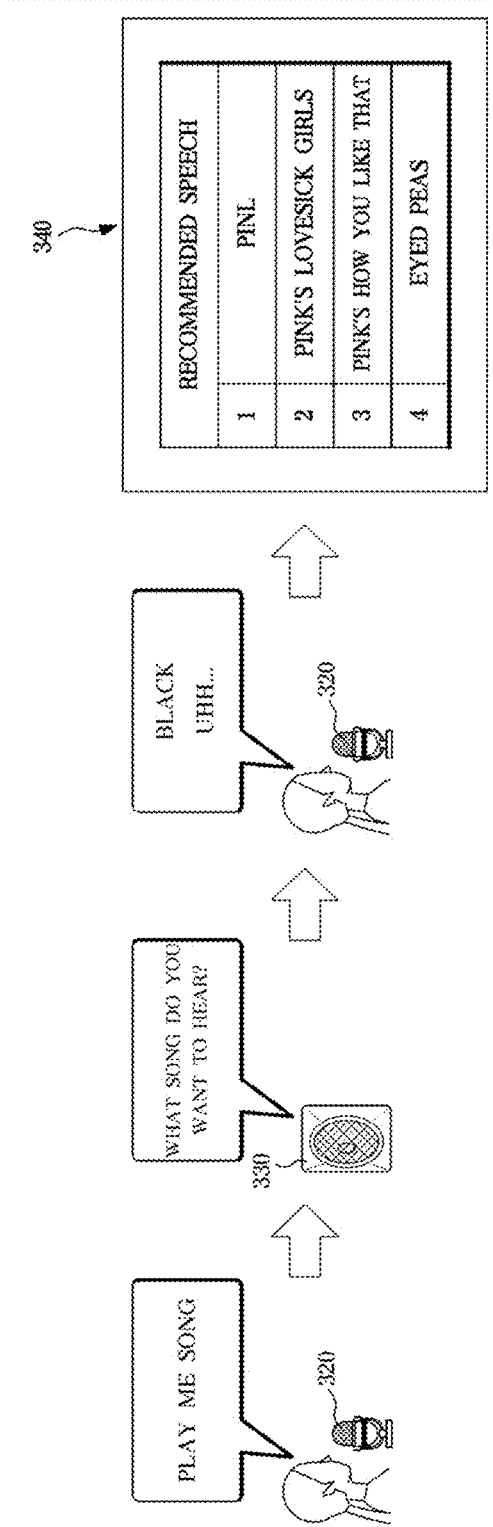

Referring to FIG. 15, when a user inputs a user's speech, "play me a song", through the microphone 320, the dialogue management system 2 may output a system speech, "what song do you want to hear?", to obtain information related to the song to play. In the present instance, the user who recalls only part of the artist's name may make an utterance such as "black, uhh . . . ".

The user's speech may be transmitted to the speech recognition system 1 or the dialogue management system 2 in real time. Also, the dialogue management module 130 may determine that a second speech pattern is included in the user's speech based on a speech recognition result and a natural language understanding result.

Also, the dialogue management module 130 may determine that a dialogue is currently ongoing based on a current dialogue context stored in the storage 140. A domain and a task of the current dialogue context are 'music' and [Ask, music] for asking a song to play, respectively.

Figure 16:
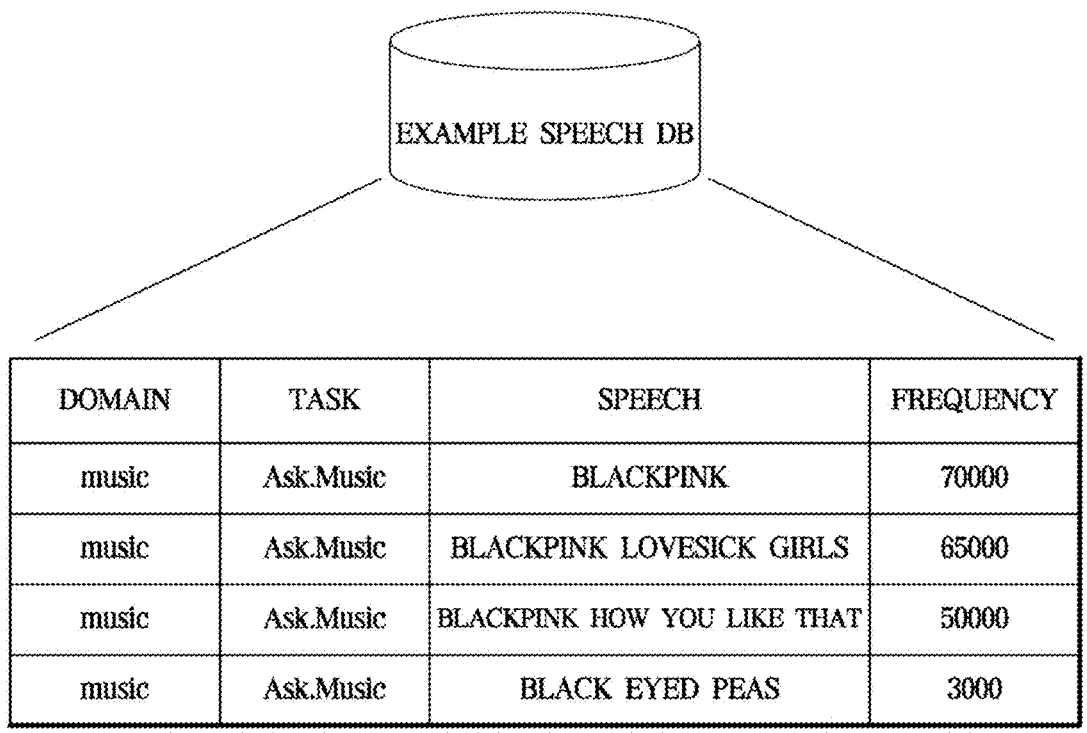

Referring to FIG. 16, the dialogue management module 130 may search an example speech database for example speeches including 'music' as a domain and [Ask, music] as a task. The example speech database is stored in the storage 140.

In the present instance, the dialogue management module 130 may search example speeches including a constituent element, included in the user's speech, among the example speeches including 'music' as a domain and [Ask, music] as a task. In the example, example speeches including "black" may be searched for.

Also, the dialogue management module 130 may search for example speeches including the constituent element positioned the same as the user's speech, among the example speeches. In the example, example speeches where "black" is positioned at the beginning of a sentence may be searched for.

When the dialogue management module 130 generates the recommended speech information based on the retrieved example speeches, entire example speeches may be included in a list, or only a part omitted from the user's speech may be included in a list.

Referring to FIG. 15, the dialogue management module 130 may generate the recommended speech information by including only remaining constituent elements, except for "black" which has already been uttered, and transmit to the user terminal 3. The user terminal 3 may display the transmitted recommended speech information on the display 340. The user may finish the user's speech by referring to the list displayed on the display 340.

Figure 17:
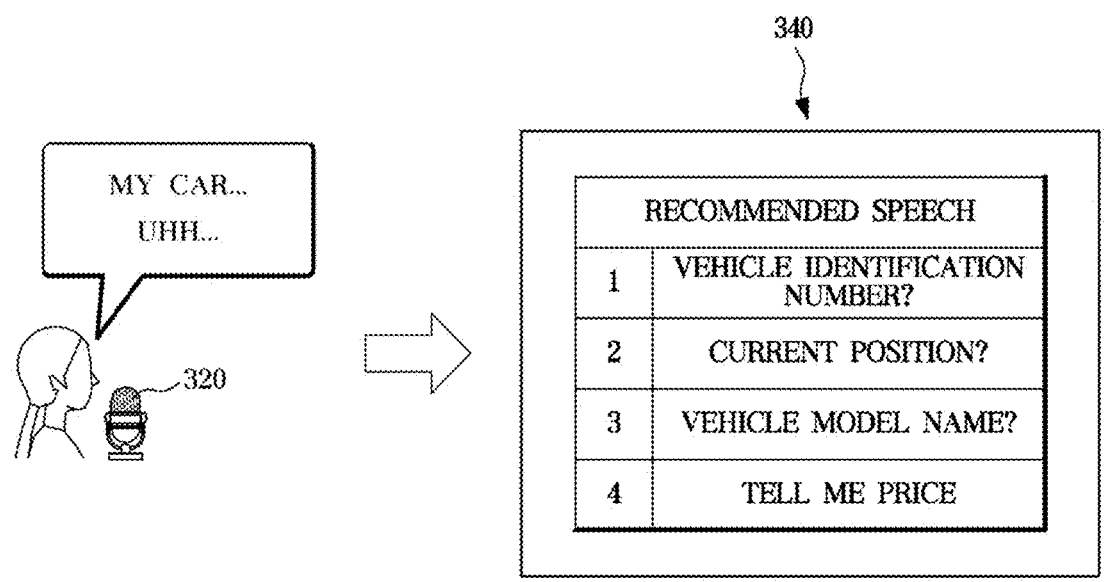

As shown in FIG. 17, when a user utters a meaningful constituent element, "my car", and then utters a filler such as "uhh . . . " because he or she does not come up with a subsequent word, the dialogue management module 130 may determine that a second speech pattern is included in the user's speech.

Also, the dialogue management module 130 may not determine that a dialogue is not ongoing based on a current dialogue context stored in the storage 140, and search for an example speech similar to the user's speech from among entire example speeches stored in the storage 140.

Figure 18:
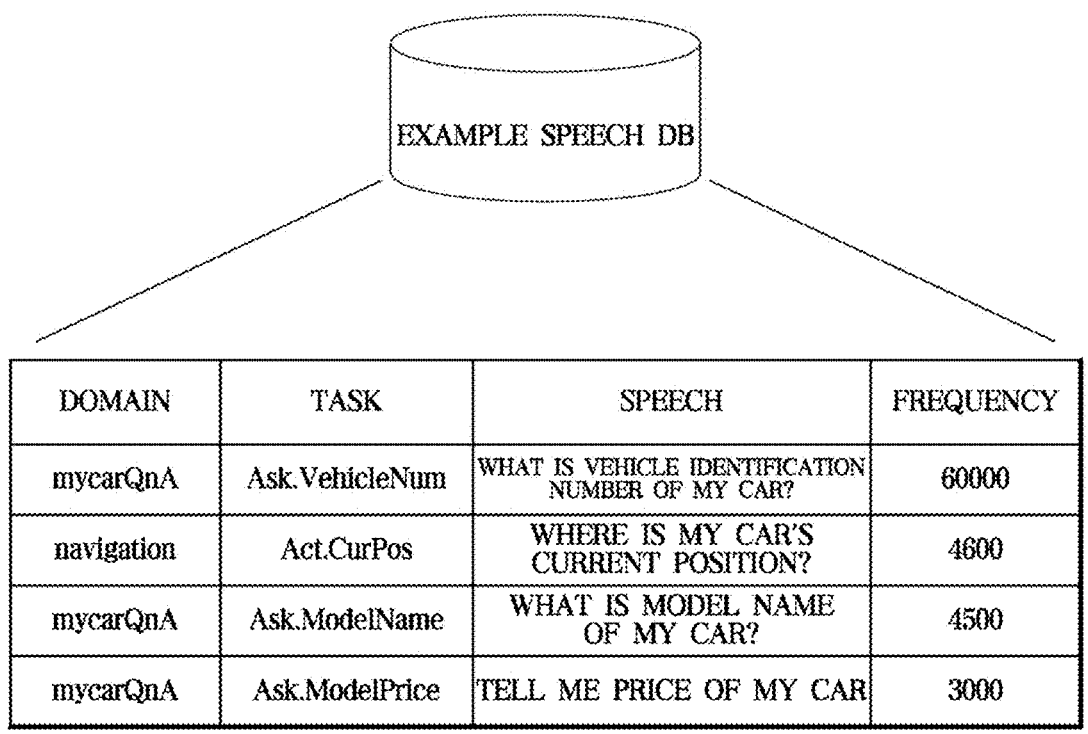

In the present instance, the dialogue management module 130 may search for example speeches including a constituent element included in the user's speech from among the entire example speeches. As shown in FIG. 18, example speeches including "my car" may be searched for.

Also, the dialogue management module 130 may search for example speeches including the constituent element positioned the same as the user's speech, among the example speeches. In the example, example speeches where "my car" is positioned at the beginning of a sentence may be searched for.

When the dialogue management module 130 generates the recommended speech information based on the retrieved example speeches, entire example speeches may be included in a list, or only a part omitted from the user's speech may be included in a list.

Referring to the example of FIG. 17, the dialogue management module 130 may generate the recommended speech information by including only remaining constituent elements, except for "my car" which has already been uttered, and transmit to the user terminal 3. The user terminal 3 may display the transmitted recommended speech information on the display 340. The user may finish the user's speech by referring to the list displayed on the display 340.

When a dialogue ends without generating recommended speech information, a system speech for identifying what is meant by a user's speech is required to be output and a user's response to the system speech is required to be processed, i.e., a depth of dialogue is increased. However, by providing an appropriate recommended speech depending on a current dialogue context and user's speech pattern like the above-described embodiment, a fast completion of speech may be guided without increasing depth of dialogue.

As is apparent from the above, according to the exemplary embodiments of the present disclosure, when a user may not input a user's speech smoothly, the dialogue management method, the user terminal, and the computer-readable recording medium can provide suitable recommended speech information depending on a specific speech pattern included in the user's speech, guiding a smooth speech.

Embodiments may be stored in a form of a recording medium storing computer-executable instructions. The instructions may be stored in a form of a program code, and when executed by a processor, the instructions may perform operations of the disclosed exemplary embodiments of the present disclosure.

The recording medium may be implemented as a computer-readable recording medium, and the recording medium is a non-transitory computer-readable medium that non-transitory stores data.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A dialogue management method, comprising:
obtaining at least one of a speech recognition result or a natural language understanding result for a speech of a user;
determining whether a fixed speech pattern is included in the speech of the user, based on the at least one of the speech recognition result or the natural language understanding result for the speech of the user; and
when the fixed speech pattern is included in the speech of the user, generating recommended speech information for guiding a completion of the speech of the user, based on at least one of a current dialogue context or a type of the fixed speech pattern included in the speech of the user, and
wherein the fixed speech pattern includes at least one of a first speech pattern including only a specific constituent element which is meaningless, or a second speech pattern including a meaningful constituent element and the specific constituent element positioned after the meaningful constituent element.

2. The dialogue management method of claim 1, wherein the type of the fixed speech pattern varies depending on a position of a specific constituent element included in the speech of the user and a characteristic of another constituent element uttered before the specific constituent element.

3. The dialogue management method of claim 1, wherein, when the first speech pattern is included in the speech of the user and a dialogue between a dialogue management system and the user is ongoing, the generating of the recommended speech information includes generating the recommended speech information based on an example speech corresponding to the ongoing dialogue.

4. The dialogue management method of claim 1, wherein, when the second speech pattern is included in the speech of the user and a dialogue between a dialogue management system and the user is ongoing, the generating of the recommended speech information includes generating the recommended speech information by use of a constituent element omitted from the speech of the user among constituent elements of an example speech corresponding to the ongoing dialogue.

5. The dialogue management method of claim 1, wherein, when the second speech pattern is included in the speech of the user and a dialogue between a dialogue management system and the user is not ongoing, the generating of the recommended speech information includes generating the recommended speech information based on an example speech similar to the speech of the user.

6. The dialogue management method of claim 5, wherein, when the second speech pattern is included in the speech of the user and the dialogue between the dialogue management system and the user is not ongoing, the generating of the recommended speech information includes generating the recommended speech information by use of a constituent element omitted from the speech of the user among constituent elements of the example speech similar to the speech of the user.

7. The dialogue management method of claim 1, wherein the obtaining of the at least one of the speech recognition result or the natural language understanding result for the speech of the user includes obtaining the at least one of the speech recognition result or the natural language understanding result for the speech of the user in real time.

8. The dialogue management method of claim 1, wherein the specific constituent element includes a filler which is a meaningless constituent element input before, after or during speech.

9. The dialogue management method of claim 1,
wherein the meaningful constituent element included in the second speech pattern forms an incomplete speech, and
wherein the fixed speech pattern further includes a third speech pattern including a constituent element forming a complete speech and the specific constituent element positioned after the constituent element forming the complete speech.

10. The dialogue management method of claim 9, further including:
when the third speech pattern is included in the speech of the user, generating a system response corresponding to the speech of the user.

11. A user terminal, comprising:
a microphone to which a speech of a user is input;
a communication module configured to transmit the speech of the user to a dialogue management system and receive recommended speech information for guiding a completion of the speech of the user from the dialogue management system; and
a display configured to display the received recommended speech information,
wherein the received recommended speech information is generated based on at least one of a current dialogue context or a type of a fixed speech pattern included in the speech of the user, and
wherein the fixed speech pattern includes at least one of a first speech pattern including only a specific constituent element which is meaningless, or a second speech pattern including a meaningful constituent element and the specific constituent element positioned after the meaningful constituent element.

12. The user terminal of claim 11, wherein, when the first speech pattern is included in the speech of the user and a dialogue between the dialogue management system and the user is ongoing, the display is configured to display the received recommended speech information generated based on an example speech corresponding to the ongoing dialogue.

13. The user terminal of claim 11, wherein, when the second speech pattern is included in the speech of the user and a dialogue between the dialogue management system and the user is ongoing, the display is configured to display the received recommended speech information generated by use of a constituent element omitted from the speech of the user among constituent elements of an example speech corresponding to the ongoing dialogue.

14. The user terminal of claim 11, wherein, when the second speech pattern is included in the speech of the user and a dialogue between the dialogue management system and the user is not ongoing, the display is configured to display the received recommended speech information generated based on an example speech similar to the speech of the user.

15. The user terminal of claim 14, wherein, when the second speech pattern is included in the speech of the user and the dialogue between the dialogue management system and the user is not ongoing, the display is configured to display the recommended speech information generated by use of a constituent element omitted from the speech of the user among constituent elements of the example speech similar to the speech of the user.

16. The user terminal of claim 11, wherein the communication module is configured to transmit the input speech of the user to the dialogue management system in real time.

17. The user terminal of claim 11, wherein the specific constituent element includes a filler which is a meaningless constituent element input before, after or during speech.

18. A computer-readable recording medium storing a program for implementing a dialogue management method, the dialogue management method comprising:
   obtaining at least one of a speech recognition result or a natural language understanding result for a speech of a user;
   determining whether a fixed speech pattern is included in the speech of the user, based on the at least one of the speech recognition result or the natural language understanding result for the speech of the user; and
   when the fixed speech pattern is included in the speech of the user, generating recommended speech information for guiding a completion of the speech of the user, based on at least one of a current dialogue context or a type of the fixed speech pattern included in the speech of the user,
   wherein the fixed speech pattern includes at least one of a first speech pattern including only a specific constituent element which is meaningless, or a second speech pattern including a meaningful constituent element and the specific constituent element positioned after the meaningful constituent element.

19. The recording medium of claim 18, wherein, when the first speech pattern is included in the speech of the user and a dialogue between a dialogue management system and the user is ongoing, the generating of the recommended speech information includes generating the recommended speech information based on an example speech corresponding to the ongoing dialogue.

20. The recording medium of claim 18, wherein, when the second speech pattern is included in the speech of the user and a dialogue between a dialogue management system and the user is ongoing, the generating of the recommended speech information includes generating the recommended speech information by use of a constituent element omitted from the speech of the user among constituent elements of an example speech corresponding to the ongoing dialogue.

21. The recording medium of claim 18, wherein, when the second speech pattern is included in the speech of the user and a dialogue between a dialogue management system and the user is not ongoing, the generating of the recommended speech information includes generating the recommended speech information based on an example speech similar to the speech of the user.

22. The recording medium of claim 21, wherein, when the second speech pattern is included in the speech of the user and the dialogue between the dialogue management system and the user is not ongoing, the generating of the recommended speech information includes generating the recommended speech information by use of a constituent element omitted from the speech of the user among constituent elements of the example speech similar to the speech of the user.

23. The recording medium of claim 18, wherein the obtaining of the at least one of the speech recognition result or the natural language understanding result for the speech of the user includes obtaining the at least one of the speech recognition result or the natural language understanding result for the speech of the user in real time.

24. The recording medium of claim 21, wherein the specific constituent element includes a filler which is a meaningless constituent element input before, after or during speech.

25. The recording medium of claim 21,
   wherein the meaningful constituent element included in the second speech pattern forms an incomplete speech, and
   wherein the fixed speech pattern further includes a third speech pattern including a constituent element forming a complete speech and the specific constituent element positioned after the constituent element forming the complete speech.

26. The recording medium of claim 25, further including:
   when the third speech pattern is included in the speech of the user, generating a system response corresponding to the speech of the user.

* * * * *